US010747720B1

United States Patent
Birdsall et al.

(10) Patent No.: US 10,747,720 B1
(45) Date of Patent: Aug. 18, 2020

(54) SYSTEMS AND METHODS FOR MANAGING ROUTING OF ELECTRONIC FILES

(71) Applicant: B-ONYX, Inc., Lindon, UT (US)

(72) Inventors: Matthew T. Birdsall, Orem, UT (US); Doug G. Hicken, Lindon, UT (US); J. Paul Norton, Provo, UT (US); John C. Stringham, Salt Lake City, UT (US); Jens C. Jenkins, Holladay, UT (US)

(73) Assignee: J. Paul Norton, Lehi, UT (US)

( * ) Notice: Subject to any disclaimer, the term of this patent is extended or adjusted under 35 U.S.C. 154(b) by 597 days.

(21) Appl. No.: 15/069,836

(22) Filed: Mar. 14, 2016

Related U.S. Application Data

(60) Provisional application No. 62/132,368, filed on Mar. 12, 2015, provisional application No. 62/245,109, filed on Oct. 22, 2015, provisional application No. 62/308,126, filed on Mar. 14, 2016.

(51) Int. Cl.
*G06F 16/13* (2019.01)
*G06F 16/182* (2019.01)
*G06F 16/27* (2019.01)
*G06F 16/28* (2019.01)

(52) U.S. Cl.
CPC ............ *G06F 16/13* (2019.01); *G06F 16/184* (2019.01); *G06F 16/27* (2019.01); *G06F 16/285* (2019.01); *G06F 16/288* (2019.01)

(58) Field of Classification Search
None
See application file for complete search history.

(56) References Cited

U.S. PATENT DOCUMENTS

| | | | | |
|---|---|---|---|---|
| 2009/0254572 | A1* | 10/2009 | Redlich | G06Q 10/06 |
| 2010/0250497 | A1* | 9/2010 | Redlich | F41H 13/00 |
| | | | | 707/661 |
| 2011/0161348 | A1* | 6/2011 | Oron | G06F 17/30781 |
| | | | | 707/769 |
| 2012/0296959 | A1* | 11/2012 | Momchilov | G06F 9/54 |
| | | | | 709/203 |
| 2014/0181021 | A1* | 6/2014 | Montulli | G06F 16/137 |
| | | | | 707/624 |
| 2014/0181040 | A1* | 6/2014 | Montulli | G06F 11/1451 |
| | | | | 707/652 |

* cited by examiner

*Primary Examiner* — Belix M Ortiz Ditren
*Assistant Examiner* — Mellissa M. Ohba
(74) *Attorney, Agent, or Firm* — Workman Nydegger

(57) ABSTRACT

Computerized systems for managing routing of an electronic file include computer-executable instructions, executable by one or more processors of the system, to cause the system to as least: receive and parse an electronic file to detect one or more words in the content of electronic file that are indicative of potential routing destinations, such as storage silos, associated with the one or more detected words; (ii) determine a set of corresponding and likely routing destinations for the electronic file, from a set of potential routing destinations, specifically based on the one or more words; and (iii) identify one or more potential changes to the words of the electronic file (based on historical data, user input, destination storage attributes, key attributes and/or other data) that are sufficient to trigger a different set of one or more corresponding routing destinations for the electronic file.

18 Claims, 5 Drawing Sheets

SYSTEMS AND METHODS FOR MANAGING ROUTING OF ELECTRONIC FILES

CROSS-REFERENCE TO RELATED APPLICATIONS

This application claims the benefit of and priority to U.S. Provisional Patent Application No. 62/132,368 entitled "Systems and Methods for Database Management," U.S. Provisional Patent Application No. 62/245,109 entitled "Systems and Methods for Document Migration," and U.S. Provisional Patent Application No. 62/308,126 entitled "Database Management and Data Migration," all of which are incorporated herein by reference in their entirety.

BACKGROUND

1. Technical Field

Embodiments disclosed herein generally relate to databases and electronic files and, even more particularly, to systems and embodiments for parsing, modifying, routing, migrating, and/or storing files within databases.

2. Relevant Technology

Computers and computing devices are integral parts of our daily life and are used for myriad purposes. They have helped streamline and organize personal and business endeavors alike. Databases are one example of computer systems that are used to create, manipulate and store electronic files. While databases are beneficial, there are a number of limitations associated with existing databases and corresponding systems and methods for routing, storing and modifying electronic files.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Implementations of the present disclosure comprise systems, methods, and apparatuses configured to detect and modify routing of an electronic file within one or more database systems.

Some implementations of the disclosed embodiments include detecting and/or modifying routing of one or more electronic files received at or contained within one or more database systems. The electronic files are parsed to facilitate the detection of one or more keys in the one or more electronic files that are indicative of potential routing destinations associated with the detected one or more keys. A set of one or more corresponding routing destinations for the one or more electronic files is determined from the potential routing destinations, based on the detected one or more keys. One or more changes are also identified, which are operable, if/when made to the electronic files, to trigger a determination of a different set of one or more corresponding/likely routing destinations for the one or more electronic files. The one or more identified changes are then provided to the user/client system to be selectively and/or automatically applied to the electronic files. Changes can also be made by the database system in addition to or independent of changes made by the user/client system.

In some embodiments, the current and historical information for the set of potential/likely routing destinations is compiled. Upon compiling the current and historical information, the user/client system is sent a subset of routing destinations chosen from the set of potential/likely routing destinations. In some instances, at least a portion of the compiled current and historical information is also sent to the user/client system, which comprises current and historical information for at least one routing destination within the subset of determined routing destinations.

In some additional and/or alternative embodiments, user instructions are received to implement at least one of the one or more identified changes at the database system and/or the client system for at least one electronic file. Upon receiving the user instructions, at least one of the one or more changes are implemented to generate a changed file. The changed file is then parsed to detect one or more changed file keys in the changed file indicative of potential changed file routing destinations associated with the one or more changed file keys. A set of one or more changed file routing destinations of the changed file is also determined, from the potential changed file routing destinations, based on the one or more detected changed file keys. A verification is also made, in some instanced, that the set of one or more changed file routing destinations comprises at least one routing destination contained in the different set of one or more corresponding routing destinations.

Additional features and advantages will be set forth in the description, which follows, and in part will be obvious from the description, or may be learned by the practice of the teachings herein.

BRIEF DESCRIPTION OF THE DRAWINGS

In order to describe the manner in which the above recited and other advantages and features of the invention is obtained, a more particular description of the invention briefly described above will be rendered by reference to specific embodiments thereof, which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
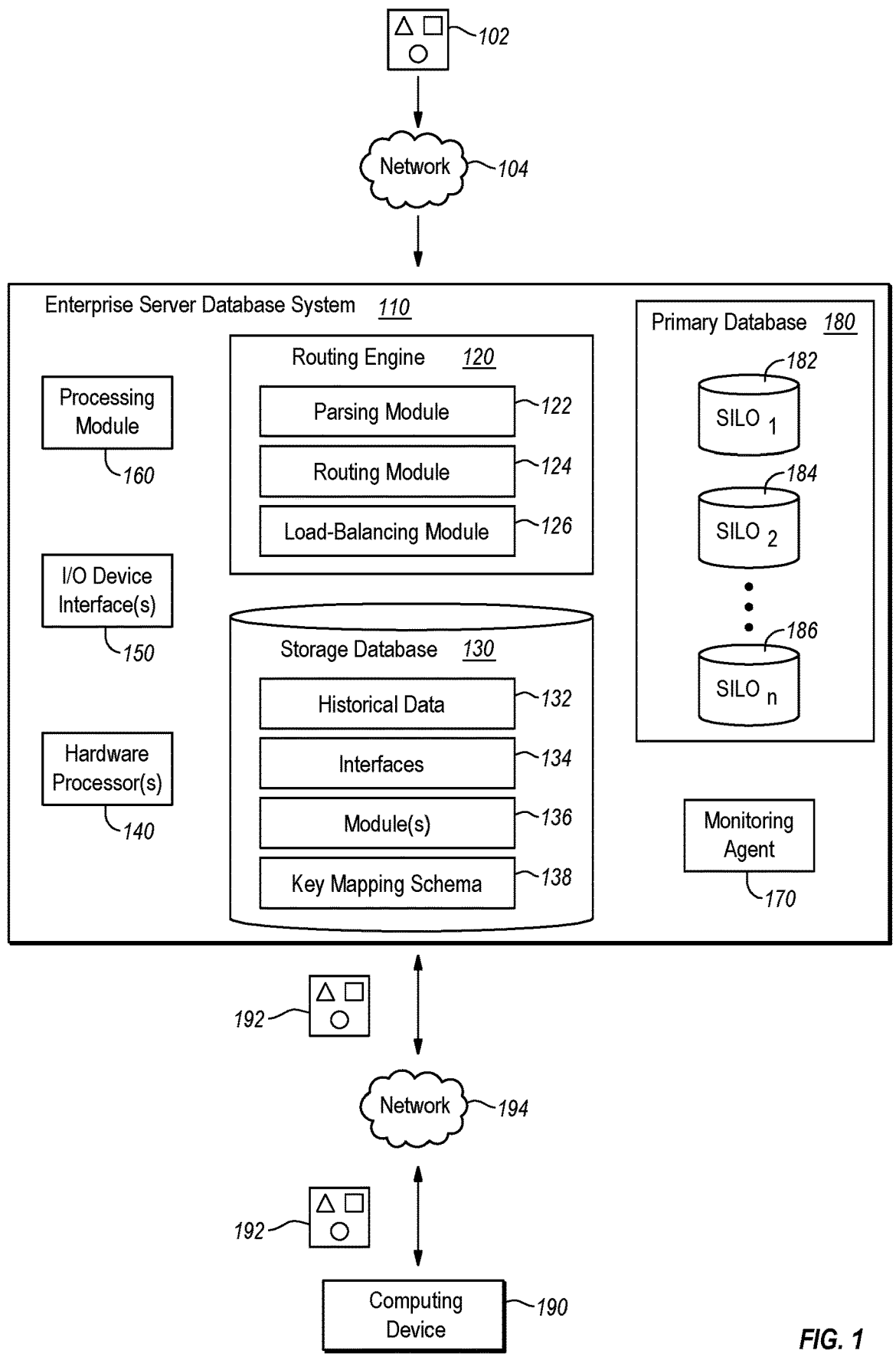
FIG. 1 is a schematic representation of a system for detecting and modifying routing of an electronic file at an enterprise server database system in accordance with one or more embodiments of the present disclosure.

1. Overview of Database Systems and Database Management

Computer systems are ubiquitous in modern day developed countries and are becoming increasingly integrated into both our work and personal lives. Personal electronic devices are one example of computer systems that have pervaded nearly every aspect of our daily lives. The typical mainstream cellular telephone is a personal electronic device that, though most infrequently used for its namesake purpose, provides valuable, routine services and fills many additional roles in our daily life that have previously required the use of a multitude of individual, separate devices or tools. We use personal electronic devices and other computing systems for seemingly every task nowadays. As a result, data are everywhere, are continually produced, and are concomitantly tracked, monitored, and stored in increasing frequency and volume.

The data revolution resulting from our technological advancements has placed a heavy burden on the technological infrastructure for transferring, parsing, routing, and/or storing data. Traditional technologies for routing and processing data to and/or within database systems often rely on deterministically routing based on metadata tags appended to the data.

For example, electronic data files stream into routers—a networking device commonly used to forward data packets or other files between connected computer systems and/or networks—and the router reads and/or otherwise detects a routing address and/or destination associated with each electronic data file from headers and/or metadata that is transmitted with the electronic files. The router compares the routing address and/or destination address with a routing information base (e.g., index, table or other mapping data structure) and directs the electronic data file to the mapped/assigned device, based on information contained within the routing information base and the router's location with respect to the file's given destination. In this manner, logically related files may be routed to the same or similar destinations. Though the routing information base may be updated, thereby potentially changing one or more logical relationships and/or routing destinations of one or more files, the router still performs the same function—detect a routing destination of an incoming file based on information that is inherent to the file and forward said file in accordance with the routing information base—routing files.

Embodiments of this disclosure further detect and use information from the data itself, other than header/metadata, to identify appropriate destinations for the data files. This granular approach can provide improved accuracy for routing of data files to correspondingly appropriate destinations.

If a destination within a database system becomes overtaxed, whether it be resulting from an inability to process the bulk flow of data constantly poured through the same network channel or whether it be resulting from an inability to simply store the data being routed, load balancing is applied to alter or otherwise divert files from an intended destination to another destination.

Disclosed embodiments further provide techniques for modifying the routing, processing, and/or storage parameters of the electronic files to route the files to different, yet still correspondingly appropriate destinations for the modified electronic files.

Load balancers have previously been known and used to mitigate non-optimal resource utilization by, for example, redistributing the workload within the system so as to relieve one overworked resource by redirecting and/or redistributing files to an underutilized resource within and/or outside of the system. However, existing load balancers do not modify the electronic documents being routed, particularly not the actual content of the electronic documents. At most, they merely modify the routing address appended to the electronic documents. Accordingly, existing load balancing schemes can sometimes result in disruptions to the logically defined and predetermined transferring, processing, routing, and/or storage configurations, thereby adding inefficiencies and chaos to the system, such as when files get routed to destinations that are not logically consistent with the content of the electronic files.

The present disclosure provides systems and methods to intelligently identify the likely/determined destination of one or more files within a database system and by identifying changes to be made to the files that will, in some instances, result in the files being routed to different destinations that are consistent with the changes being made to the electronic files and to thereby preserve logical consistencies between the attributes of the electronic files and the attributes of the destined storage locations. In some embodiments, for example, the systems and methods provided herein allow for more efficient routing and/or storage of files. This may be implemented by altering the contents, keys, metadata, and/or any other reasonable aspects of the data files, themselves, and (in some instances) without changing context of the underlying data, while still affecting a change in the determined routing for the electronic files, and instead of making changes to or otherwise modifying the routing parameters of a routing device (e.g., without changing and/or updating the routing tables in the routing information base). By making modifications to the content of the electronic files themselves, rather than the routing schemes, it is also possible to effectuate efficient load balancing of the electronic files by causing new corresponding destinations to be identified for the modified electronic files that are logically and contextually consistent with modified attributes of the modified documents. In some instances, the changes to the content merely emphasizes or minimizes certain detected attributes of the electronic document, to clarify an intended or actual context of the electronic documents, and without changing the actual context of the underlying content, and in such a way as to help identify the most appropriate and contextually relevant storage locations to route the electronic documents to. This way erroneous routing of documents to inappropriate storage locations is avoided.

Technical and industrial benefits can also be achieved, prior to fully routing/processing the electronic file, by simply identifying the likely designated destinations for the electronic files, which can be used to reduce the overall network bandwidth and resource requirements required to route and process electronic files, such as when a user identifies an undesired routing destination and terminates or otherwise prevents the routing and processing of the electronic file.

One or more embodiments of the present disclosure may be applied within various industries, systems and/or devices, including within networks, database systems, server database systems, servers, file storage databases, routers, network routers, electronic data networks, bridges, gateways, firewalls, switches, other packet switching technologies, data security systems, among others.

2. Abbreviated List of Defined Terms

To assist in understanding the scope and content of the foregoing and forthcoming written description and appended claims, a select few terms are defined directly below. Additional defined terms and various methods, computing systems, and storage devices related to the present disclosure are provided in a separate section farther below.

For the purposes of this description, the term "file" is intended to include any defined unit of data that may be transferred, queued, stored, parsed, routed, compiled, and/or processed electronically. The term "file" includes any electronic file, comprising a computer-readable data structure, which is usable for storing data and/or transferring data over a network. The disclosed files may be formatted according to any suitable file type, as understood by those having skill in the art. Files may contain any type or quantity of data. For example, data contained within files may comprise any combination of binary elements, source code, object code, arrays, tables, numbers, text, characters, graphics, images, audio and other data. The files may include encrypted or unencrypted data. The files may also be compressed or uncompressed. The files may be manifest by or processed by any appropriate programming language and/or computing interface. An electronic file may also include single stand-alone files, as well as distributed or segmented files.

The term "key" or "keys" generally refers to one or more characters (e.g., Arabic numerals, Latin alphabet letters, Japanese kanji, Chinese Hanzi, Korean hanja, etc.), tuples (e.g., a finite ordered list of characters), or a combination of characters and tuples that are incorporated into or are otherwise associated with a file, the content(s) of a file, and/or the appended/referenced metadata for a file. In one or more embodiments, keys may include symbols, words, phrases, graphics, images, addresses, other information, or a combination of the foregoing that are likewise incorporated into or otherwise associated with a file, the content(s) of a file, and/or the metadata of a file.

The term "destination" may refer to its common dictionary definition where appropriate, but it may, especially in the context of digital locations (or other physical locations, whether temporary or permanent), refer to any of a container, database, storage silo, and/or other hardware or software storage location and/or processing system within and/or associated with a computing device, computing system, network device, and/or database system. In some embodiments, the destination of a file is an intended or predicted destination which may be the same as or different than an actual destination where a file is routed.

The term "routing information base" includes one or more data table or other structured or unstructured data element that includes a list of one or more particular destinations and/or routing information that is used for routing files to one or more particular destinations. In some cases, a routing information base may include metrics associated with the routing information and/or destinations. Metrics associated with a routing information base may include, for example, distances and/or keys that are descriptive of, define, characterize, and/or that are otherwise associated with one or more routing parameters for files and/or their destinations. Additionally or alternatively, one or more destinations and/or routing parameters included in a routing information base may similarly be described by, defined by, characterized by, and/or otherwise associated with one or more rule(s), tag(s), metadata, and/or other parameters or identifier(s). The routing information base may deterministically route files by applying a routing metric, wherein the routing metric calculates and/or predicts a destination and/or routing parameters based on one or more criteria (e.g., one or more file keys, historical keys, weighting thresholds, the file destination parameters, etc.).

In one or more instances, one or more destinations and/or routing parameters share one or more attributes, distances, addresses, keys, rules, tags, metadata tags, identifiers, and/or combinations thereof ("routing rules"). In some instances, at least one destination and/or routing parameter includes a unique set of one or more routing rules that is distinct from at least one other destination and/or routing parameter within the same and/or a different routing information base. A routing information base may, additionally or alternatively, include a pre-defined set of routing rules for one or more destinations and/or file keys.

As used herein, a routing information base may be referenced, accessed, and/or otherwise used by one or more modules, hardware or software processors, databases, monitoring agents, and/or devices. In one or more embodiments, a routing information base may incorporate or rely on a key mapping schema to inform and/or update one or more particular destinations. Those having skill in the art understand that a routing information base may also automatically update or be manually updated based on one or more protocols and/or by mechanisms known in the art.

While the detailed description is separated into sections, the section headers and contents within each section are not intended to be self-contained descriptions and embodiments. Rather, the contents of each section within the detailed description are intended to be read and understood as a collective whole where elements of one section may pertain to and/or inform other sections. Accordingly, embodiments specifically disclosed within one section may also relate to and/or serve as additional and/or alternative embodiments in another section having the same and/or similar systems, modules, devices, methods, and/or terminology.

3. Enterprise Server Database Systems

Embodiments of the present disclosure enable systems for detecting and modifying routing of files within one or more database systems, which may be accomplished by modifying the files, themselves. In some embodiments, this may result in files being routed to destinations that may potentially be different than the destinations the files may have been routed to absent any modifications to the files. One benefit this may provide is that it may enable files to avoid overburdened and/or inefficient destinations, and instead, route them to destinations having attributes that are more contextually relevant to detected attributes of the files (e.g., destinations have predefined attributes matching detected attributes of the files and/or that at least store other files having similarly detected attributes) and where they may potentially be processed/stored more consistently with other files within the one or more database systems. This proactive routing may also increase the overall efficiency of a particular database system by spreading the workload across multiple destinations and by helping to avoid routing files to destinations that originally would have been logically/contextually incompatible or less compatible than the newly assigned/designated destinations, by proactively detecting/making changes to the files that change and/or clarify attributes/keys of the files associated with the context of the underlying file content.

By proactively detecting and/or applying changes to the files that are operable to affect routing of the files, it is possible to provide a user with greater control over routing of the files. This is an improvement over systems that rely on less efficient and/or problematic alternatives, such as predetermined load balancer schemes. According to some embodiments of the present disclosure, it is possible to modify a file while preserving the intended context and relatedness of the file with a set of one or more contextually appropriate destinations, and without sacrificing the fidelity of the logical distributions inherent within a well-organized database and/or database system. Fidelity of a database could be compromised, for example, by routing a file to a storage destination within the database that is not the best contextual fit for the file. Maintaining fidelity of a database is particularly beneficial for enterprise server database systems, such as database systems within a closed enterprise network. Fidelity of a database is also important for distributed and open systems, such as cloud-based and Internet-based systems.

Referring now to FIG. 1, depicted is one example embodiment that, generally, includes a file 102 uploaded through or otherwise transmitted over network 104 to an enterprise server database system 110 that routes file 102 to a destination within primary database 180 (e.g., silos 182, 184, and/or 186). Within enterprise server database system 110, the routing of file 102 may be modified so that file 102 is routed to a different destination within primary database 180.

With continued reference to FIG. 1, file 102 is received at enterprise server database system 110 through network 104, where the file is processed within routing engine 120. Routing engine 120, as depicted, includes a parsing module 122, a routing module 124, and a load-balancing module 126. In some embodiments, the parsing module 122 reads and/or analyzes (e.g., parses) file 102, including any characters (e.g., Arabic numerals, Latin alphabet letters, Japanese kanji, Chinese Hanzi, Korean hanja, etc.), tuples (e.g., a finite ordered list of characters), symbols, words, phrases, graphics, images, addresses, other information, or a combination of the foregoing that are incorporated into or are otherwise associated with file 102, the contents of a file 102, and/or the metadata of a file 102. The parsing module 122 further detects one or more keys of file 102, the keys being indicative of potential routing destinations associated with the one or more keys.

The routing engine 120 may further comprise a routing module 124. In some embodiments, the routing module 124 of routing engine 120 determines a set of one or more corresponding routing destinations of file 102, from the potential routing destinations, based on the one or more keys detected by the parsing module 122. Determining potential routing destinations may, in one or more embodiments, be accomplished by comparing the keys to a routing information base and/or a key mapping schema 138. In some embodiments, the key mapping schema may be a routing information base and/or be including within a routing information base that includes historical trends associated with storing other files, including information about the presence, frequency and location of certain keys within files that have been routed to and/or stored in one or more destinations of a database.

In some embodiments, the routing module determines a set of one or more corresponding routing destinations for one or more files based on one or more keys of the one or more files but it may additionally include other factors, such as the language, file type, compression state, encryption level and/or other similar factors, which are distinguished from the previously mentioned key attributes, when determining the corresponding routing destinations for the one or more files.

The routing engine 120 may utilize a load-balancing module 126 to facilitate routing of the files. In an embodiment, the load-balancing module 126 of routing engine 120 identifies one or more changes, which are operable, if made to the file, to trigger a determination of a different set of one or more corresponding routing destinations for the file, wherein the different set of routing destinations are determinable by comparing the keys associated with the file to the key mapping schema 138.

The identified one or more changes are changes to the identified keys within the file, including changes for replacing, replicating, omitting, moving, and/or otherwise altering one or more of the identified keys. For instance, the changes may include deleting one or more keys from the file, adding one or more keys to the file, changing a relative location of the one or more keys within the content of the file, changing a formatting of the one or more keys in the file, and/or modifying the one or more keys of the file in a different manner.

In some embodiments, the modification of the key(s) will include changing elements of the key such that the key represents a related or unrelated key after implementing the modifications. In such an embodiment, a file incorporating one or more modified key(s) and/or modification(s) to one or more key(s) will result the modified file being routed to a designated destination that has storage attributes that are logically/contextually similar to attributes the modified file and file key(s). In some instances, the destination is a different destination than a previously designated destination for the file (prior to incorporating the modified key(s)).

In some embodiments, the load-balancing module incorporates and applies a natural language processing component or other similar component for use in identifying keys and key attributes (type, frequency, location, formatting, etc.) from the files.

With reference now to routing destinations within the enterprise server database system 110 of FIG. 1, the primary database 180 comprises the routing destinations of enterprise server database system 110. Each individual routing destination of primary database 180 is represented as a storage silo (182, 184, 186), and in some embodiments, the storage silos of primary database 180 collectively comprise all routed files received by the primary database. Though illustrated as storage silos, in one or more embodiments, the silos may comprise any suitable storage configuration, including any container, database, and/or other hardware or software storage configuration, including distributed configurations that are maintained within and/or associated with a computing device, computing system, network device, and/or database system.

Primary database 180 may contain any number of storage silos. As depicted in FIG. 1, primary database 180 comprises storage silo$_1$ 182, storage silo$_2$ 184, and storage silo$_n$ 186, and in some embodiments, storage silo$_n$ 186 represents any individual storage silo, n, within the plurality of storage silos ranging from storage silo$_1$ to storage silo$_n$, where n is a positive integer. Storage silos may act as separate queues for processing files and/or store files for retrieval and processing at a later time.

In some embodiments, storage silos are configured to receive distinct and/or logically related files with a certain degree of fidelity/consistency. For example, storage silo$_1$ 182 is configured to receive and store files having a first set of keys and/or key attributes whereas storage silo$_2$ 184 is configured to receive and store files having a second and different or non-overlapping set of one or more keys/key attributes that are distinct from the one or more keys/key attributes defining files routed to storage $silo_1$ 182. This segregation between silos is selectably granular, to preserve a desired level of fidelity between the different storage silos.

In some embodiments, the primary database is logically organized such that each individual storage silo comprises logically related files having similar keys/key attributes. The organizational logic of the primary database correlates with the routing information base of the database system. In some embodiments, the organizational logic of the primary database is based on the routing information base of the database system. In other embodiments, the routing information base of the database system is based on the organizational logic of the primary database. In one embodiment, the organizational logic of the primary database and the routing information base of the database system are co-evolving and/or bi-directionally incorporate detected changes and/or updates.

With continued reference to FIG. 1, particularly referring now to the monitoring agent 170 of enterprise server database system 110, monitoring agent 170 compiles current and/or historical information of the routing destinations within primary database 180. That is, in some embodiments, the monitoring agent 170 individually and/or comprehensively compiles the current and/or historical information of storage $silo_1$ 182, storage $silo_2$ 184, and any other storage silos within primary database 180 (represented by storage $silo_n$ 186). In one or more embodiments, the current and/or historical information comprises qualitative and/or quantitative metrics associated with the one or more destinations.

For example, the monitoring agent 170 compiles quantitative metrics such as, for example, the distance to the routed destination, the routing time to the destination, the length of time one or more files have been at the destination, the capacity of the destination, the processing rate of the destination (e.g., the bit rate), and other important metrics.

Additionally or alternatively, one or more components of the enterprise server database system calculates one or more additional quantitative data associated with routing destinations. Exemplary components that are operable to calculate quantitative data include the monitoring agent 170, another module 136 configured to calculate and store the calculated data in historical data 132, one or more hardware processor 140, and/or processing module 160. The one or more additional quantitative data is predicated on one or more quantitative metrics compiled by the monitoring agent 170 and may comprise any combination of bandwidth, network delay, hop count, path cost, load, maximum transmission unit, remaining capacity, reliability, communication cost or QoS (quality of service) associated with each destination.

In some embodiments, the monitoring agent 170 compiles qualitative data. The qualitative data includes data as defined by ranges of quantitative data, by algorithms, by failing and/or meeting standards (whether a technical standard or a user and/or administrator-defined standard), and/or by other methods known by those having skill in the art. In some embodiments, qualitative data is calculated by any of the same foregoing components referred to above that are operable to calculate the one or more additional quantitative data.

In some embodiments, the monitoring agent 170 utilizes a machine-learning algorithm to derive one or more keys from the current and/or historical data and may communicate those one or more keys to the load-balancing module 126 and/or to the routing information base. The monitoring agent 170 may continuously update and/or inform the machine learning algorithm as it compiles current and/or historical information from the destinations and/or one or more files within the destinations.

In some embodiments, one or more quantitative and/or qualitative data of a destination are communicated to a routing information base and/or indirectly referenced through a mapping index, without directly attaching any information to routed files and/or the routing information base.

In some embodiments, one or more quantitative and/or qualitative data of a destination are communicated to the load-balancing module such that the load-balancing module is enabled to identify one or more changes of file 102 based, at least in part, on the compiled current and historical information and/or calculated derivatives thereof.

In some embodiments, any and/or all of the data detected, determined, and/or identified by routing engine 120 are provided to the user separate from and/or inclusive with data within the storage database 180 and/or data compiled by the monitoring agent 170. In such embodiments, the data are also provided to the user by displaying and/or transmitting the data at computing device 190, receivable through network 194. However, providing the data to the user may occur by any means understood and commonly used by a person having ordinary skill in the art. Nonetheless, one or more embodiments for providing data from an enterprise server database system to a user are specifically included below.

In some embodiments, the current and/or historical information compiled by the monitoring agent 170 are provided independently to the user at computing device 190 via one or more interfaces of I/O device 150. These interfaces 134 are stored in storage database 130.

In some embodiments, the one or more changes identified by the load-balancing module 126 are communicated to the user through one or more interfaces of the I/O device 150. Additionally or alternatively, the load-balancing module 126 provides the one or more changes to the processing module 160 to be processed with and/or compared with at least a subset of the current and/or historical information of the destinations that are relevant to the one or more changes. The current and/or historical information are provided to the processing module 160 directly by monitoring agent 170 and/or by a module 136 within storage database 130 that is configured to communicate the historical data 132 to the processing module 160.

With continued reference to FIG. 1, particularly referring now to the processing module 160 of enterprise server database system 110, processing module 160 is configured to include, but not yet assimilate, the one or more changes identified by the load-balancing module 126 together with at least a portion of the current and/or historical information into file 102. In some embodiments, the processed file is then provided to the user at computing device 190 via one or more interfaces of I/O Device 150. In some embodiments, the processed file comprises the file 102, at least a subset of the one or more corresponding routing destinations for the file 102, at least a portion of the compiled current and historical information relating to the subset corresponding routing destinations.

In some embodiments, the enterprise server database system 110 receives a newly uploaded file from the user, wherein the newly uploaded file comprises file 102 incorporating at least one of the one or more changes. In an alternative embodiment, the enterprise server database system 110 receives one or more user instructions to implement at least one of the one or more changes.

The enterprise server database system 110, in some embodiments, automatically implements the one or more user-instructed changes to file 102 through processing module 160 or another module 136 configured to implement one or more changes to file 102. In other embodiments, the one or more changes are automatically implemented based on one or more metrics associated with the set of one or more corresponding routing destinations or the different set of one or more corresponding routing destinations.

In some embodiments, implementing the user instructions causes the changed file comprising the user-instructed changes to be routed to a destination that is explicitly identified or chosen by the user via user input entered at one of the interfaces. In one or more embodiments, the enterprise server database system 110 verifies that the user-instructed changes are sufficient to cause routing of the changed file to the user-desired destination. This comprises the changed file being parsed by the parsing module 122 to detect one or more changed file keys that may be indicative of potential changed file routing destinations followed by the routing module 124 determining a set of changed file routing destinations based on the one or more changed file keys. In some embodiments, verification further comprises identifying the user desired routing destination within the set of changed file routing destinations. In some embodiments, the user defined routing destination is the only routing destination within the set of changed file routing destinations and/or the quantitatively and/or qualitatively best destination within the set of changed file routing destinations. In an additional or alternative embodiment, verifying that the user-instructed changes are sufficient to cause routing of the changed file to the user desired destination comprises identifying that the set of one or more changed file routing destinations determined by the routing module 124 comprises at least one routing destination contained in the different set of corresponding routing destinations.

In some embodiments, the user instructions include instructions to terminate the routing of the file. For example, the database system sends a file together with one or more set of corresponding routing destinations, which in some embodiments include metrics associated with the corresponding routing destinations, to the user. These metrics are presented, in some embodiments, as statistical likelihoods (e.g., percentages) in which the file will be routed to one or more possible destinations, with a same or different likelihood/percentage being associated with each of the corresponding one or more possible destinations (e.g., x % for being routed to destination 1, y % for being routed to destination 2, or z % for being routed to at least one of destination 1 or 2).

Upon receiving and reviewing the file and associated information, the user determines that none of the corresponding routing destinations are preferable and/or sufficient destinations for the file and/or that the specified likelihood is below or above a preferred threshold. Accordingly, the user sends user instructions to the database system indicating that routing of the file is to be terminated. In some embodiments, terminating the routing of the file occurs before any changes are implemented to the file and may occur automatically based on predetermined threshold settings received as user input at the interfaces.

Terminating routing of even one file to one or more destinations provides technical benefits and utility. For example, database processing efficiencies and reductions in processing requirements are achieved when the database does not have to process, transmit, enqueue, and/or store a file that would have otherwise been routed to the destination absent the automatic and/or manual override that causes the processing/routing to be terminated in response to the identified likelihood that the file will likely be routed to an undesired location.

As a generalized example of FIG. 1, a file is received by a database system, and upon receipt, the file is processed within a routing engine to determine a set of prospective and potential routing destinations. Processing by the routing engine includes the file being parsed to identify one or more keys, a comparison of the identified keys to determine a set of prospective routing destinations, and a determination of putative changes that may be made to the file to effect routing of the file to potential routing destinations—a different set of routing destinations than the previously identified set of prospective routing destinations. Data from the routing engine is provided to a user with or without information relating to prospective routing destinations compiled by a monitoring agent. The database system receives user instructions to implement changes to the file and implements the changes followed by and routing the changed file, or the database system verifies that the changed file will be routed to the user desired destination before routing the changed file.

As the foregoing generalized example succinctly relates to one or more embodiments of FIG. 1 and with reference to illustrations provided therein, a file 102 is received at enterprise server database system 110 and parsed by parsing module 122, wherein keys associated with file 102 may be elucidated. In the embodiment illustrated in FIG. 1, file 102 comprises at least three keys—represented as a triangle, a square, and a circle on the face of file 102. The routing module 124 determines a set of corresponding routing destinations for file 102, by comparing the keys elucidated by parsing module 122 to a key mapping schema 138. Concurrent with or sequential to the routing module's 124 determination, the load-balancing module 126 identifies putative changes to keys of file 102 that if made, would trigger a different set of corresponding routing destinations for the file, as determined by reference to the key mapping schema 138. The file 102, the keys determined by parsing module 122, along with the identified changes to keys and resulting routing destination changes identified by the load-balancing module are returned to the user through an interface 134 transmitted and/or displayed by the I/O device 150 along network 194.

The data provided to a user, based on the foregoing is, in some embodiments, further accompanied by current and historic data, compiled by the monitoring agent 170, relating to other possible routing destinations (and corresponding attributes of those routing destinations) where the file will likely be routed when the identified changes are implemented to the file.

The database system receives user instructions to implement changes to the file, such as based on user input entered in response to prompts that are displayed with the foregoing data, and the database system either implements the changes automatically using the processing module 160 followed by routing the changed file with the routing engine 120 to a corresponding destination in the primary database 180, and/or the database system verifies the changed file will be routed to the user-desired destination before routing the changed file by parsing the changed file at the parsing module 122 to identify changed file keys and determining the user desired routing destination is among the set of routing destinations defined at the routing module 124 based on the changed file keys.

In one or more embodiments, the routing engine and/or storage database includes additional or fewer modules than what is presently illustrated and/or includes additional functionalities and/or excludes one or more of the described functionalities referenced herein with respect to FIG. 1.

4. Server Analytic Database Systems and Destination Database Systems

The disclosure above comprises embodiments and examples of components, modules, and systems for detecting and modifying routing of an electronic file within one or more database systems, specifically within an enterprise server database system, and makes particular, reiterated reference to FIG. 1. The disclosure provided within this section comprises embodiments and examples of components, modules, and systems for detecting and modifying routing of an electronic file within one or more database systems, particularly a server analytic database system and a destination database system, and will make particular, reiterated reference to FIG. 2.

Figure 2:
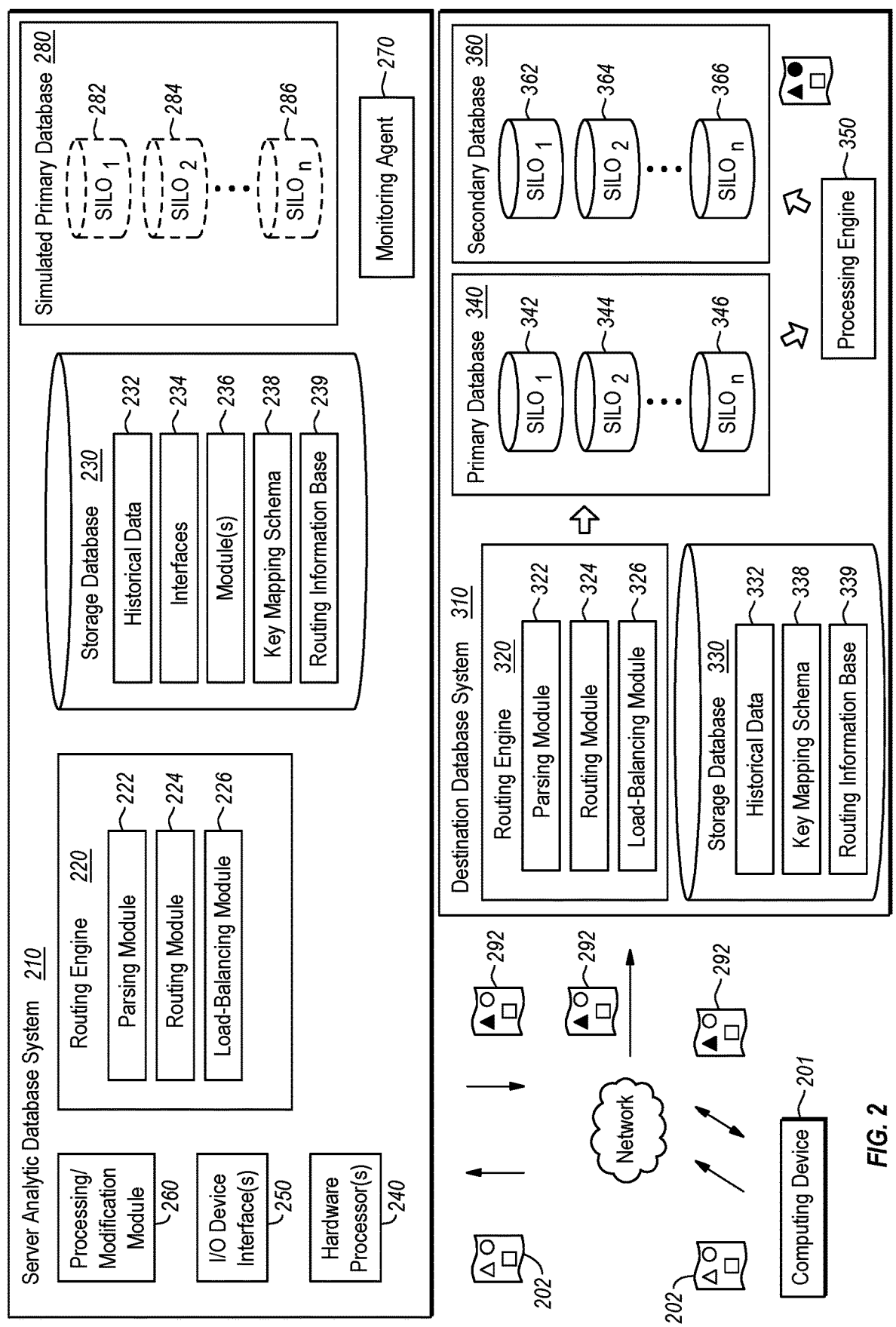
FIG. 2 is a schematic representation of a system for detecting and modifying routing of an electronic file that includes a server analytic database system and a destination database system in accordance with one or more embodiments of the present disclosure.

In some embodiments, there is considerable overlap in the functionality of components, modules, and systems, illustrated in FIGS. 1 and 2. For example, many of the modules and/or components of enterprise server database system 110 of FIG. 1 and the server analytic database system 210 are the same and/or similar. As an exemplary illustration of this, routing engine 120 and routing engine 220 comprise substantially the same modules, and in some embodiments, the two routing engines perform substantially the same role within their respective database systems, processing files in the same or substantially the same ways. The same applies to other components, modules, and/or systems in FIG. 2. Therefore, differences within FIG. 2 and its associated embodiments and/or other alternative embodiments will be the focus of this section of the disclosure.

Referring now to FIG. 2, depicted is one example embodiment that, generally, includes a file 202 uploaded through or otherwise transmitted over a network to a server analytic database system 210 that modifies file 202 so that the modified file 292 is routed to a different destination when submitted to a destination database system 310 than file 202 would be routed to. The modified file 292 is submitted to destination database system 310 and routed to a queue within primary database 340 until being processed by processing engine 350. Following processing, which, in some embodiments further modifies the file, the file is stored within a destination within secondary database 360.

With continued reference to FIG. 2, file 202 is received at sever analytic database system 210 through a network, where the file is processed within routing engine 220. Routing engine 220, as depicted, includes a parsing module 222, a routing module 224, and a load-balancing module 226. Each of the recited modules comprise substantially the same functionality as their counterparts within FIG. 1 (i.e., modules 122, 124, and 126). Principally, the parsing module 222 detects one or more keys of file 202, the routing module 224 determines a set of one or more corresponding routing destinations of file 202 based on the one or more keys detected by the parsing module 222, and the load-balancing module 226 identifies one or more changes, which are operable, if made to the file, to trigger a determination of a different set of one or more corresponding routing destinations for the file 202.

With reference now to routing destinations within the server analytic database system 210 of FIG. 2, the simulated primary database 280 comprises simulated routing destinations of the primary database 340 and/or the secondary database 360, where the destinations within the simulated primary database 280 comprise substantially the same logical organization and metrics of at least one or both of the primary database 340 and/or the secondary database 360. The simulated primary database 280, in some embodiments, maintains substantially the same or similar characteristics as the primary and/or secondary 340, 360 databases of the destination database system 310 as a result of monitoring agent 270 monitoring one or more characteristics of the primary and/or secondary databases 340, 360 and simulating those characteristics in the simulated primary database 280. In some embodiments, a specialized module 236 is used to incorporate, synthesize, and/or to otherwise effect the rendering of simulated primary database 280. The monitoring agent 270 additionally or alternatively has access to the key mapping schema 338 and/or the routing information base 339, which is used in generating the simulated primary database 290 in one or more embodiments.

In some embodiments, the monitoring agent 270 employs a machine learning algorithm to simulate routing of files into the simulated primary database 280, which increases the likelihood that simulated primary database 280 is similar to the primary and/or secondary databases 240, 260. The machine learning algorithm, in some embodiments, is a partially supervised algorithm where the key mapping schema 338 and/or the routing information base 339 are used to train the model. In some embodiments, the machine learning approach may include decision tree learning, neural networks, convolutional neural networks, clustering, Bayesian networks, an ensemble model, or other approaches known by those having skill in the art. With respect to key mapping schema 228 and routing information base 239 of server analytic database system 210, these components are the same as their counterparts in the destination database system 310 in some embodiments. However, in other embodiments, they are different.

In some embodiments, the key mapping schema 228 and routing information base 239 are based on an incomplete set of data and are, therefore, subject to inefficiencies in predicting and/or determining one or more routing destinations based on keys. In some embodiments, a machine learning algorithm or an ensemble of machine learning algorithms supplements the key mapping schema and/or the routing information base to increase reliable predictions and/or determinations of routing based on keys. In some embodiments, the machine learning algorithm and/or the ensemble of machine learning algorithms are informed by current and/or historical information relating to the primary and/or secondary databases.

With continued reference to FIG. 2, particularly referring now to the monitoring agent 270 of server analytic database system 210, monitoring agent 270 additionally compiles current and/or historical information of the routing destinations within primary and/or secondary databases 340, 360. In one or more embodiments, the current and/or historical information comprises qualitative and/or quantitative metrics associated with the one or more destinations. For example, the monitoring agent 270 compiles the same and/or substantially similar quantitative metrics and qualitative metrics as monitoring agent 170, including one or more calculated metrics described above.

Accordingly, in one or more embodiments, a file 202 uploaded to server analytic database system 210, and the keys, corresponding routing destinations, one or more changes to be made to modify the corresponding routing destinations, and/or metrics associated with any of the corresponding routing destinations are provided by the routing engine 220, the monitoring agent 270, and/or one or more modules and/or components of the storage database 280. The file and any of the foregoing data are communicated to the user through a network and receivable at computing device 201. The embodiments disclosing various methods, interfaces, devices, components, systems, and/or modules that are involved in communicating between the user and the enterprise server database system 110 of FIG. 1 apply to communications between the user and the server analytic database system 210 of FIG. 2.

In some embodiments, the server analytic database system 210 receives a newly uploaded file from the user, wherein the newly uploaded file comprises file 202 incorporating at least one of the one or more changes communicated to the user by the server analytic database system 210. In an alternative embodiment, the server analytic database system 210 receives one or more user instructions to implement at least one of the one or more changes. In some embodiments, the server analytic database system 210 implements the user instructed changes in a same or similar manner as described with respect to FIG. 1 to produce changed file 292. In some embodiments, the changed file 292 is substantially similar and/or the same as the aforementioned newly uploaded file by the user.

In some embodiments, the user, in addition to or as an alternative to providing the server analytic database system with instructions to change one or more keys, provides one or more input that specifies the user-defined context of the file. This, in one or more embodiment, includes the user determining which keys are determinative of and/or represent the context of the file as understood and/or otherwise indicated by the user. In some embodiments, the server analytic database system updates the one or more changes that, if made to the file, would cause routing to a corresponding set of one or more different routing destinations to promote routing to destinations that are more logically related to and/or representative of the keys identified by the user that correspond to the user-defined context of the file.

As with embodiments described with respect to FIG. 1, embodiments of FIG. 2 are understood to include automatic implementation of one or more user-instructed changes and manual implementation of the one or more user-instructed changes. Changes and/or modifications are implemented the same and/or similar manner utilizing processing module 260. In some embodiments, however, verifying that implemented changes will promote routing of the changed file 292 to the desired destination may be accomplished in one or more additional embodiments with respect to systems disclosed in FIG. 2. In some embodiments, the changed file is subjected to a simulated routing where the changed file 292 is routed through routing engine 220 and temporarily stored and/or virtually routed to a destination within simulated primary database 280.

The file 202 is depicted as having at least three keys—a blank triangle key, a blank circle key, and a blank square key. The shaped keys are figurative representations of different terms/tuples or other key attributes. Changed file 292 is depicted as having at least three keys also. However, the triangle in changed file 292 is filled instead of blank, indicating a changed key. The changed key can include a completely different key and/or a same key having different attributes (e.g., reformatting or movement of a key). The changed file 292 may be submitted to destination database system 310, in some embodiments, by server analytic database system 210 and/or by the user and/or a third party via computing device 201. Upon being received at destination database system 310, the changed file 292 is routed by the routing engine 320. The routing engine 320 comprises the same or similar modules as the other routing modules 120, 220 described herein. In some embodiments, the routing engine 320 and at least modules 322 and 324, perform the same and/or similar roles of parsing the changed file 292 to detect one or more keys and determining a routing destination based on the one or more keys and as informed by one or more of the key mapping schema 338 and the routing information base 339.

In some embodiments, the changed file 292 is subsequently routed to a queue within primary database 340 and awaits processing by the processing engine 350. Upon processing at the processing engine 340, the changed file 292 is further changed before being transferred to secondary database 360 for additional processing and/or storage. The further modifications implemented to changed file 292 are depicted in FIG. 2 as the blank circle key now being a filled circle key.

While FIGS. 1 and 2 depict several independent modules (e.g., 122, 124, 126, 136, 160, 222, 224, 226, 236, 260, 322, 324, and 326), one will understand the characterization of a module is at least somewhat arbitrary. In at least one implementation, the modules of FIG. 1 and/or FIG. 2 may be combined, divided, or excluded in configurations other than that which is shown. As used herein, individual modules are provided for the sake of clarity and explanation and are not intended to be limiting. It will also be appreciated that all of the functionality of FIG. 1 is also applicable to the embodiments described in reference to FIG. 2.

5. Methods for Selectively Routing Files within an Enterprise Server Database System to a Desired Routing Destination FIGS. 1-2 and the corresponding text illustrate or otherwise describe one or more components, modules, systems and/or mechanisms for detecting and modifying routing of an electronic file within one or more database systems. One will appreciate that embodiments of the present invention can also be described in terms of methods comprising one or more acts for accomplishing a particular result. For example, FIGS. 3-6, with the corresponding text, illustrate or otherwise describe a sequence of acts in a method for detecting and modifying routing of an electronic file within one or more databases. The acts of FIGS. 3-6 are described below with reference to the components, modules, and systems illustrated in FIGS. 1-2.

Figure 3:
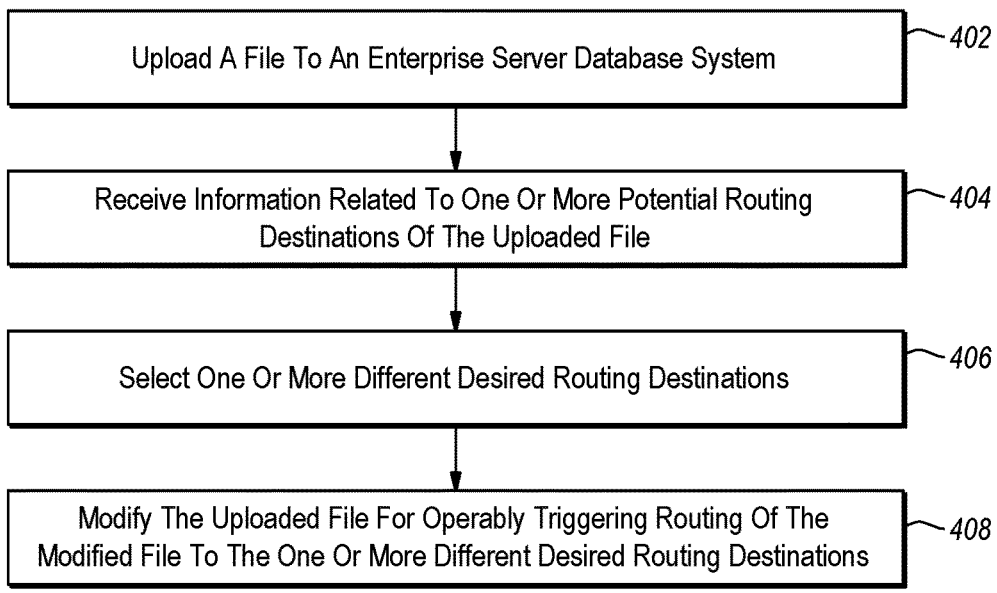
FIG. 3 depicts a flowchart of a method for selectively routing files within an enterprise server database system to a desired routing destination in accordance with one or more embodiments of the present disclosure.

FIG. 3 shows that a method 400 for selectively routing files within an enterprise server database system to a desired routing destination includes an act 402 of uploading a file to an enterprise server database system. Method 400 is, for example, considered from the user perspective. With exemplary reference to FIG. 1, computing device 190 is a user computer wherein a user uploads a file to an enterprise server database system. Further, the enterprise server database system 110 of FIG. 1 is the enterprise server database system from act 402. In some embodiments, the user uploading a file to an enterprise server database system causes the enterprise server database system to implement a method including acts 442, 444, 446, 448, 450, 452, 454, 456, and 458 of FIG. 5.

FIG. 3 also includes act 404 of receiving information related to one or more potential routing destinations of the uploaded file. In some embodiments of the present disclosure, the information includes user instructions for implementing one or more changes to the file, which may be based on data received from the enterprise server database system, including, for example, possible routing destinations associated with one or more modified keys and/or metrics associated with one or more potential routing destinations. For example, the computing device 190 of FIG. 1 is a user computer where the user receives information, and the user is receiving the information on computing device 190 as a result of one or more interfaces 134 of I/O device 150 transferring and/or displaying the information to computing device 190 over network 194 to the computing device 190.

The method of FIG. 3 also includes act 406 of selecting one or more different desired routing destinations. For example, the computing device 190 of FIG. 1 is a user computer where the user selects one or more desired routing destinations. Further, one or more user interfaces 134 of enterprise server database system 110 are displayed to user through I/O device 150 and may be configured to allow the user to select one or more different desired routing destinations.

FIG. 3 shows that the method for selectively routing files within an enterprise server database system to a desired routing destination includes an act 408 of modifying the uploaded file for operably triggering routing of the modified file to the one or more different desired routing destinations. Act 408 comprises automatically modifying the uploaded file at the computing device 190 of FIG. 1. Act 408 additionally or alternatively comprises the user modifying the uploaded file with user instructions for implementing one or more changes to the file. For example, the computing device 190 of FIG. 1 is a user's computer where the user modifies the uploaded file. Further, one or more user interfaces 134 of enterprise server database system 110 are displayed to the user through I/O device 150 and are configured to allow the user to modify the uploaded file.

Figure 5:
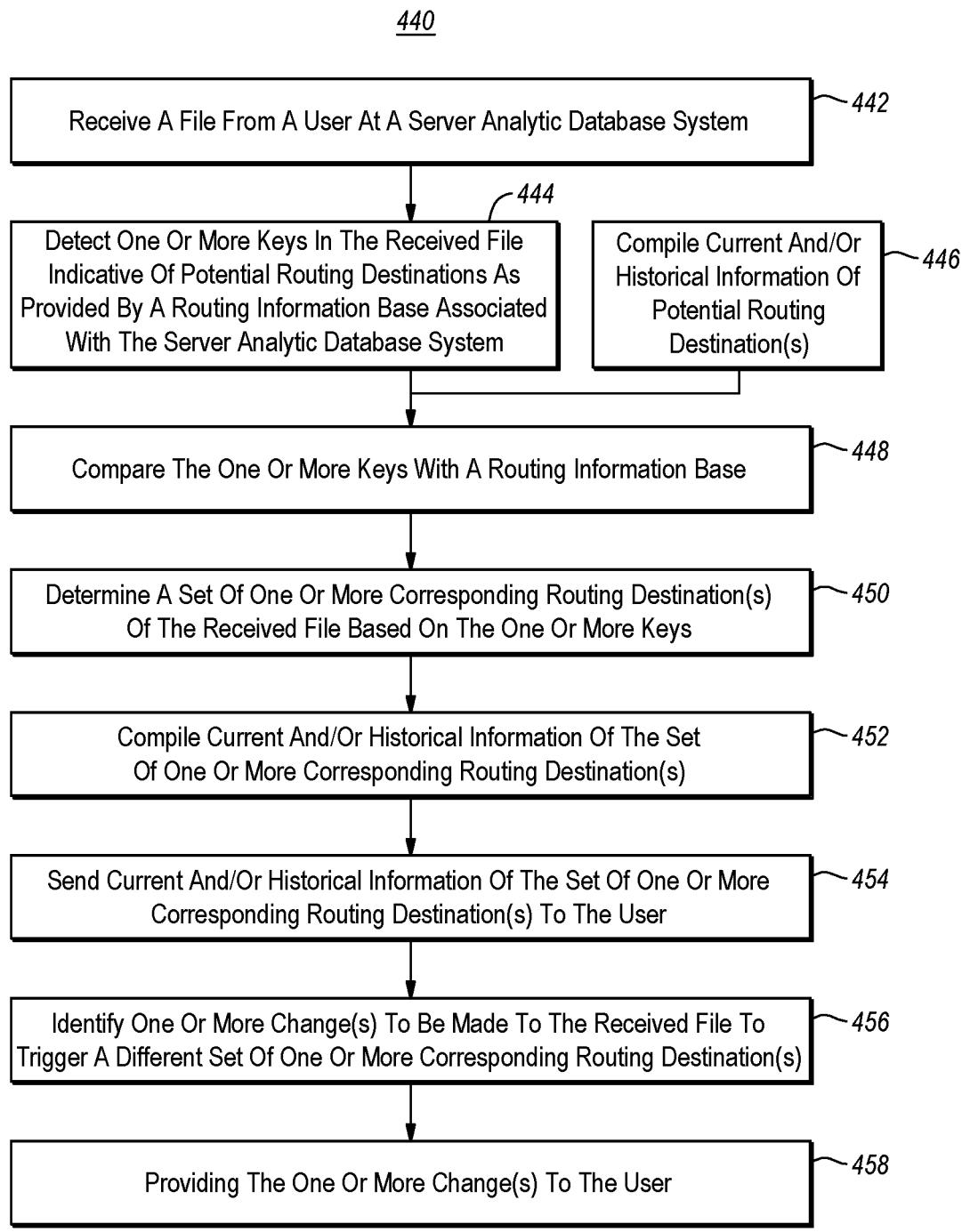
FIG. 5 depicts a flowchart of a method for identifying one or more changes to a file to trigger a different set of routing destinations in accordance with one or more embodiments of the present disclosure.

In some embodiments, the user modifying the uploaded file for operably triggering routing of the modified file to the one or more different desired routing destinations causes the enterprise server database system to implement a method including acts 442, 444, and 448 of FIG. 5. In some embodiments, the user modifying the uploaded file for operably triggering routing of the modified file to the one or more different desired routing destinations causes the enterprise server database system to implement a method including acts 480, 482, and 486 of FIG. 6. In some embodiments, the user modifying the uploaded file for operably triggering routing of the modified file to the one or more different desired routing destinations causes the enterprise server database system to implement a method including act 484 and optionally act 486 of FIG. 6.

Figure 4:
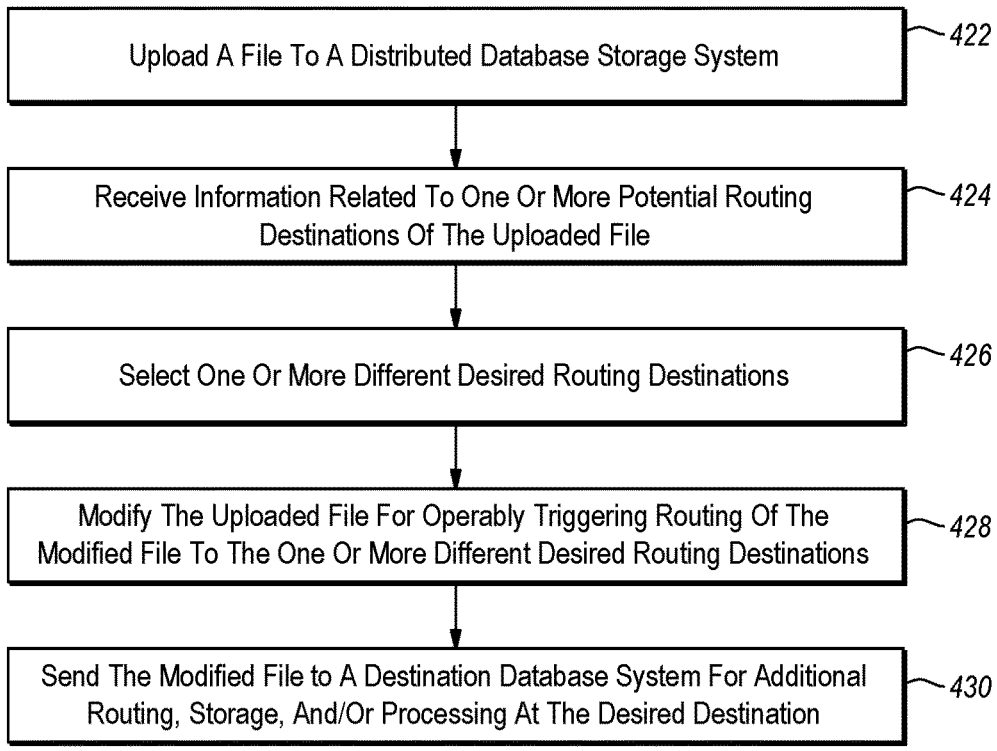
FIG. 4 depicts a flowchart of a method for selectively routing files to one or more desired routing destinations in accordance with one or more embodiments of the present disclosure.

6. A Computerized Method for Selectively Routing Files to One or More Desired Routing Destinations FIG. 4 shows that a method 420 for selectively routing files to one or more desired routing destinations includes an act 422 of uploading a file to a distributed database storage system. Method 420 may, for example, be considered from the user perspective. With exemplary reference to FIG. 2, computing device 201 is a user computer wherein a user uploads a file to a server analytic database system. Further, the server analytic database system 210 of FIG. 2 is the server analytic database system of act 422. In some embodiments, the user uploading a file to a server analytic database system causes the server analytic database system to implement a method including acts 472, 474, 476, and 478 of FIG. 6.

FIG. 4 also includes act 424 of receiving information related to one or more potential routing destinations of the uploaded file. In some embodiments of the present disclosure, the information includes user instructions for implementing one or more changes to the file, which are based on data received from the server analytic database system, including, for example, possible routing destinations associated with one or more modified keys and/or metrics associated with one or more potential routing destinations. For example, the computing device 201 of FIG. 2 is a user computer where the user receives information, and the user is receiving the information on computing device 201 as a result of one or more interfaces 234 of I/O device 250 transferring and/or displaying the information to computing device 201 over a network.

The method of FIG. 4 also includes act 426 of selecting one or more different desired routing destinations. For example, the computing device 201 of FIG. 2 is a user computer where the user selects one or more desired routing destinations. Further, one or more user interfaces 234 of server analytic database system 210 are displayed to a user through I/O device 250 and are configured to allow the user to select one or more different desired routing destinations.

FIG. 4 shows that the method 420 for selectively routing files to one or more desired routing destinations includes an act 428 of modifying the uploaded file for operably triggering routing of the modified file to the one or more different desired routing destinations. Act 428 comprises automatically modifying the uploaded file at the computing device 201 of FIG. 2. Act 428 additionally or alternatively comprises the user modifying the uploaded file with user instructions for implementing one or more changes to the file. For example, the computing device 201 of FIG. 2 is a user computer where the user modifies the uploaded file. Further, one or more user interfaces 234 of server analytic database system 210 are displayed to user through I/O device 250 and are configured to allow the user to modify the uploaded file The method of FIG. 4 also includes act 430 of sending the modified file to a destination database system for additional routing, storage, and/or processing at the desired destination. For example, the modified file 292 FIG. 2 is the modified file of act 430. Further, the destination database system 310 of FIG. 2 is the destination database system of act 430. As a further example, routing engine 320 of FIG. 2 provides the additional routing of act 430, primary database 340 of FIG. 2 and/or processing engine 350 of FIG. 2 provides the additional processing of act 430, and/or secondary database 360 of FIG. 2 provides the additional storage of act 430. In some embodiments, the user sending the modified file to a destination database system for additional routing, storage, and/or processing at the desired destination causes the server analytic database system to implement an analogous method of FIG. 6 where analogous acts are performed at a destination database system instead of a sever analytic database system, including analogous acts 472, 474, and 476.

7. Methods for Identifying One or More Changes to a File to Trigger a Different Set of Routing Destinations FIG. 5 shows that a method 440 for identifying one or more changes to a file to trigger a different set of routing destinations includes an act 442 of receiving a file from a user at a server analytic database system. Method 440, for example, is considered from the database system perspective. With exemplary reference to FIG. 2, server analytic database system 210 is the server analytic database system from act 442. Further, the routing engine 220 of FIG. 2 is the component of a server analytic database system that acts to receive the file.

FIG. 5 also includes act 444 of detecting one or more keys in the received file indicative of potential routing destinations as provided by a routing information base associated with the server analytic database system. For example, parsing module 222 of FIG. 2 acts to detect one or more keys in the received file. In some embodiments of the present disclosure, parsing module 222 detects the one or more keys in the received file by parsing the received file and, if the received file comprises text, implements a natural language processing module or similarly functioning model to elucidate or otherwise detect keys within and/or associated with the received file.

The method of FIG. 5 also includes act 446 of compiling current and/or historical information of potential routing destinations. For example, monitoring agent 270 of FIG. 2 is the component of the server analytic database system that performs act 446, and the monitoring agent 270 may, in some embodiments, compile the current and/or historical information directly from the primary 340 and/or secondary databases 360 of destination database system 310, may compile the current and/or historical information from simulated primary database 280, and/or may compile current data from a combination of the foregoing while simultaneously and/or sequentially compiling historical data from the historical data 232 within storage database 230 of server analytic system 210 and/or from the historical data 332 within destination database system 310.

FIG. 5 shows that the method for identifying one or more changes to a file to trigger a different set of routing destinations includes an act 448 of comparing the one or more keys with a routing information base. For example, the routing information base 239 of FIG. 2 is the routing information base of act 448. Further, the load-balancing module 226 of FIG. 2 and/or a module 236 of FIG. 2 that is configured to compare the one or more keys with a routing information base can perform act 448.

FIG. 5 also includes act 450 of determining a set of one or more corresponding routing destination(s) of the received file based on the one or more keys. In some embodiments of the present disclosure, determining a set of one or more corresponding routing destinations includes considering one or more metrics associated with routing destinations within the set of one or more corresponding routing destinations. For example, the routing module 224 of FIG. 2 is performing act 450.

The method of FIG. 5 also includes act 452 of compiling current and/or historical information of the set of one or more corresponding routing destination(s). For example, monitoring agent 270 of FIG. 2 is the component of the server analytic database system that performs act 452, and the monitoring agent 270, in some embodiments, compiles the current and/or historical information directly from the primary 340 and/or secondary databases 360 of destination database system 310, compiles the current and/or historical information from simulated primary database 280, and/or compiles current data from a combination of the foregoing while simultaneously and/or sequentially compiling historical data from the historical data 232 within storage database 230 of server analytic system 210 and/or from the historical data 332 within destination database system 310.

The method of FIG. 5 also includes act 454 of sending current and/or historical information of the set of one or more corresponding routing destination(s) to the user. For example, I/O device 250 of FIG. 2 is the component of server analytic database system performing act 454. In some embodiments, the current and/or historical information may comprise metrics associated with the set of corresponding routing destination(s) that influences or otherwise informs the user of desirable and/or undesirable destination(s) within the set of corresponding routing destination(s).

FIG. 5 also includes act 456 of identifying one or more change(s) to be made to the received file to trigger a different set of one or more corresponding routing destination(s). In some embodiments of the present disclosure, the one or more changes to be made are based on changing one or more keys associated with the file. In some embodiments of the present disclosure, identifying one or more change(s) to be made to the received file to trigger a different set of one or more corresponding routing destination(s) comprises considering one or more metrics associated with routing destinations within the different set of one or more corresponding routing destination(s). For example, the load-balancing module 224 of FIG. 2 is performing act 456. Further, information from the monitoring agent 270 and/or the historical data stores 232, 332 comprises one or more metrics that may be factors included in considering routing destinations.

The method of FIG. 5 also includes act 458 of providing the one or more change(s) to the user. In some embodiments, the one or more changes are provided to the user by displaying and/or transmitting the data at computing device 201, receivable through a network. In some embodiments, the one or more changes(s) are provided to the user through one or more interfaces of the I/O device 250. In some embodiments, the load-balancing module 226 provides the one or more change(s) to the processing module 260 where they are processed with at least a subset of the current and/or historical information of the destinations that are relevant to the one or more changes. In some embodiments, providing the one or more change(s) to the user causes the user to implement a method including acts 404, 406, and 488 of FIG. 3 or to implement a method including acts 426, 428, and 430 of FIG. 4.

Figure 6:
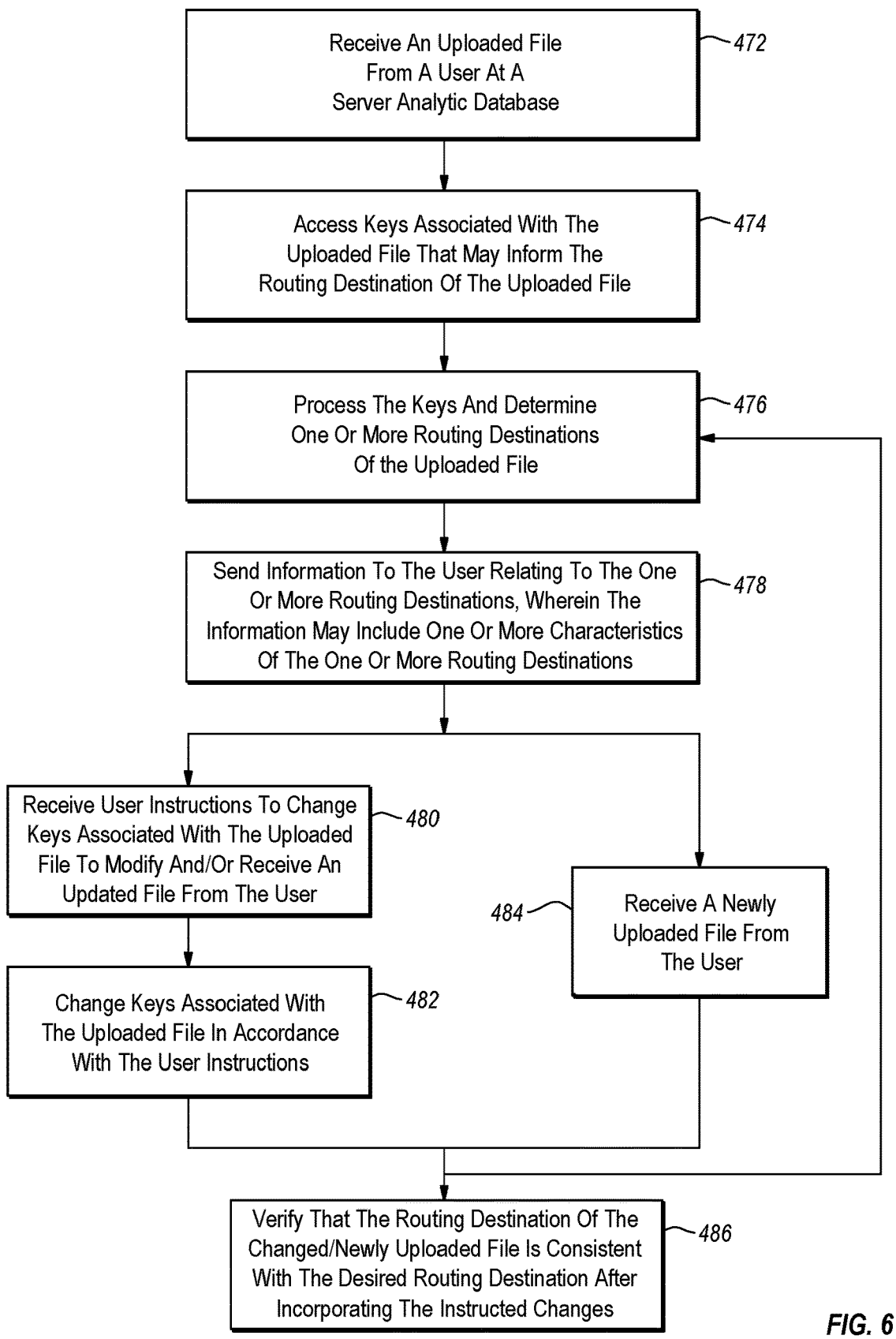
FIG. 6 depicts a flowchart of a method for modifying a received file at a server analytic database system to change the routing destination of the received file according to one or more embodiments of the present disclosure.

8. Methods for Modifying a Received File at a Server Analytic Database System to Change the Routing Destination of the Received File FIG. 6 shows that a method 470 for modifying a received file at a server analytic database system to change the routing destination of the received file includes an act 472 of receiving an uploaded file from a user at a server analytic database. Method 470, for example, is considered from the database system perspective. With exemplary reference to FIG. 2, server analytic database system 210 is the server analytic database from act 472. Further, the routing engine 220 of FIG. 2 is the component of a server analytic database that acts to receive the file. With continued reference to FIG. 2, file 202 is the file received at the server analytic database, and the user transmits file 202 for the server analytic database to receive by using network connecting the server analytic database and a user computer, which is the computing device 201 from FIG. 2.

FIG. 6 shows that a method 470 for modifying a received file at a server analytic database system to change the routing destination of the received file includes an act 474 of accessing keys associated with the uploaded file that may inform the routing destination of the uploaded file. In some embodiments, accessing keys associated with the uploaded file comprises parsing the uploaded file. For example, the parsing module 222 is the component of the server analytic database that performs act 474.

FIG. 6 also includes act 476 of processing the keys and determining one or more routing destinations of the uploaded file. In some embodiments of the present disclosure, processing the keys comprises comparing the keys to a routing information base and/or a key mapping schema. In some embodiments, the routing module 224 determines one or more routing destinations of the uploaded file. For example, the routing information base 230 and the key mapping schema 238 of FIG. 2 are the components implementing at least a portion of act 476 (e.g., processing the keys). Further the routing module 224 of FIG. 2 is the component implementing at least a portion of act 476 (e.g., determining one or more routing destinations of the uploaded file).

The method of FIG. 6 also includes act 478 of sending information to the user relating to the one or more routing destinations, wherein the information may include one or more characteristics of the one or more routing destinations. Act 478 comprises sending one or more changes to the keys wherein the one or more changes to the keys may impact the routing destination of the file. In some embodiments, the information is sent to the user by displaying and/or transmitting the data at computing device 201, receivable through a network. In some embodiments, the information is sent to the user through one or more interfaces of the I/O device 250. In some embodiments, the load-balancing module 226 provides at least a portion of the information, particularly the one or more changes that are made to the file that, when implemented, impact the routing destination of the file, to the processing module 260 where they are processed with at least a subset of the current and/or historical information of the destinations that are relevant to the information sent to the user. In some embodiments, sending the information to the user causes the user to implement a method including acts 426, 428, and 430 of FIG. 4.

FIG. 6 shows that the method 470 for modifying a received file at a server analytic database system to change the routing destination of the received file includes an act 480 of receiving user instructions to change keys associated with the uploaded file to modify and/or receive an updated file from the user. Act 480 may comprise a desired routing destination. In some embodiments, the user instructions are received at the server analytic database system 210 of FIG. 2 and more particularly the user instructions are received at the routing engine 220 of FIG. 2.

FIG. 6 also includes act 482 of changing keys associated with the uploaded file in accordance with the user instructions. In some embodiments, the processing/modification module 260 of FIG. 2 changes the keys associated with the uploaded file in accordance with the user instructions. In an additional or alternative embodiment, the keys are changed in accordance with the user instructions by one or more hardware processor(s) 240 that may be combined with a specially configured module 236 that is configured to implement the user-specified changes.

The method of FIG. 6 also includes act 484 of receiving a newly uploaded file from the user. Act 484 is implemented within method 470 as an alternative act to acts 480 and 482. With respect to act 484, routing engine 220 of FIG. 2 is the component of server analytic database system 210 that receives the newly uploaded file form the user. In some embodiments, the server analytic database receives the newly uploaded file through a network connecting the system with the user computer, which in some embodiments, is represented by computing device 201 of FIG. 2.

The method of FIG. 6 also includes act 486 of verifying that the routing destination of the changed/newly uploaded file is consistent with the desired routing destination after incorporating the instructed changes. Act 486 comprises accessing the keys of the changed/newly uploaded file, comparing the changed/newly uploaded file keys with a routing information base and/or key mapping schema, and/or determining the routing destinations of the changed/newly updated file based on the changed/newly updated file keys. Embodiments and examples of the foregoing have been recited above and may be referenced within descriptions of acts 474, 476, and 478. In some embodiments, act 486 causes the server analytic database system to implement a method, including acts 444, 448, 450, 452, and 456 in addition to an act of comparing the routing destinations determined in act 456 with the routing destination received in act 480 to ensure the set of one or more routing destination associated with the changed/newly updated file comprises at least the desired routing destination received by the user.

9. Various Methods, Computing Systems, and Storage Devices Related Hereto

The foregoing example embodiments are for illustrative purposes only and should not be construed to limit the scope of the present disclosure.

Various methods, computing systems and storage devices will now be described with reference to the foregoing disclosed embodiments.

In this description and in the claims, the term "computing system" is defined broadly as including any device or system (or combination thereof) that includes at least one physical and tangible processor, and a physical and tangible memory capable of having thereon computer-executable instructions that may be executed by the processor.

In its most basic configuration, a computing system includes at least one processing unit and memory. The memory may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

As used herein, the term "executable module" or "executable component" can refer to software objects, routings, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory of the computing system.

The computer-executable instructions may be used to implement and/or instantiate all of the disclosed functionality, particularly as disclosed in reference to the methods described herein, including the accessing, parsing, routing, modifying and storing of files and, additionally or alternatively, data structures. The computer-executable instructions are also to implement and/or instantiate user interfaces for presenting output to a user and for receiving user input.

The computing system may also contain communication channels that allow the computing system to communicate with other message processors over, for example, a network.

Embodiments described herein may comprise or utilize special-purpose or general-purpose computer system components that include computer hardware, such as, for example, one or more processors and system memory. The system memory may be included within the overall memory. The system memory may also be referred to as "main memory," and includes memory locations that are addressable by the at least one processing unit over a memory bus in which case the address location is asserted on the memory bus itself. System memory has been traditionally volatile, but the principles described herein also apply in circumstances in which the system memory is partially, or even fully, non-volatile.

Embodiments within the scope of this disclosure also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, and not limitation, embodiments of the invention can comprise at least two distinctly different kinds of computer-readable media: computer storage media and transmission media.

Computer storage media are physical hardware storage devices that store computer-executable instructions and/or data structures. Physical hardware storage devices include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality of the invention.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. Networks may be "private" or they may be "public," or networks may share qualities of both private and public networks. A private network may be any network that has restricted access such that only the computer systems and/or modules and/or other electronic devices that are provided and/or permitted access to the private network may transport electronic data through the one or more data links that comprise the private network. A public network may, on the other hand, not restrict access and allow any computer systems and/or modules and/or other electronic devices capable of connecting to the network to use the one or more data links comprising the network to transport electronic data.

For example, a private network found within an organization, such as a private business, restricts transport of electronic data between only those computer systems and/or modules and/or other electronic devices within the organization. Conversely, the Internet is an example of a public network where access to the network is, generally, not restricted. Computer systems and/or modules and/or other electronic devices may often be connected simultaneously or serially to multiple networks, some of which may be private, some of which may be public, and some of which may be varying degrees of public and private. For example, a laptop computer may be permitted access to a closed network, such as a network for a private business that enables transport of electronic data between the computing systems of permitted business employees, and the same laptop computer may also access an open network, such as the Internet, at the same time or at a different time as it accesses the exemplary closed network.

When information is transferred or provided over a network or another communications connection (either hardwired, wireless, or a combination of hardwired or wireless) to a computer system, the computer system may view the connection as transmission media. Combinations of the above should also be included within the scope of computer-readable media.

Program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

Alternatively, or in addition, the functionality described herein can be performed, at least in part, by one or more hardware logic components. For example, and without limitation, illustrative types of hardware logic components that can be used include: Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

When the referenced acts of the disclosed methods are implemented in software, the one or more processors of the computing system perform the acts and direct the operation of the computing system in response to having executed the stored computer-executable instructions defined by the software. Various input and output devices, not illustrated, can be used by the computing system to receive user input and to display output in accordance with the computer-executable instructions.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A computing system for managing routing of an electronic file within one or more database systems having a plurality of different storage silos, each of the different storage silos corresponding to different sets of keys, the sets of keys comprising at least one of characters or words, the computing system comprising:
   one or more processors; and
   one or more computer-readable hardware storage devices having stored thereon computer-executable instructions that are executable by the one or more processors to cause at least the following:
      the computing system to receive an electronic file at a database system, the electronic file comprising (a) metadata and (b) content that is distinguished from the metadata and that includes one or more words;
      the computing system to parse the content of the electronic file and detect the one or more words contained in the content of the electronic file to determine a set of keys for the electronic file that are associated with potential routing destination storage silos for the electronic file, the determined set of keys being used to identify the one or more potential routing destination storage silos for the electronic file from the plurality of different storage silos, each storage silo in the plurality of different storage silos being configured to receive and store electronic files having different corresponding keys, respectively, the different storage silos including a first storage silo configured to receive and store electronic files having a first set of keys, and a second storage silo configured to receive and store electronic files having a second set of keys that is different than the first set of keys;
      the computing system to compare the determined set of keys of the electronic file to a key mapping schema that includes historical trend data associated with other electronic files that have been routed to and/or stored within the plurality of different storage silos based on at least one of a presence, frequency or location of certain keys within the other electronic files that have been stored in and/or routed to the plurality of different storage silos;
      the computing system to, based at least on the comparison of the determined set of keys of the electronic file to the key mapping, determine with the computing system a first set of one or more routing destination storage silos associated with the electronic file, including at least the first storage silo and the second storage silo, from the potential storage silos;
      the computing system to identify, with the historical trend data of the key mapping schema, one or more potential changes to the one or more words in the content of the electronic file that are sufficient to trigger a determination of a different set of one or more routing destination storage silos corresponding with the electronic file, from the plurality of storage silos, based on the one or more potential changes being made to the one or more words and a corresponding contextual relevance of the electronic file associated with a subsequent comparison of keys in the electronic document after the potential changes are made, and the key mapping schema; and
      the computing system to provide the one or more potential changes to a user.

2. A computing system as in claim 1, wherein the computer-executable instructions further cause the computing system to compile current and historical information of the set of one or more corresponding storage silos.

3. A computing system as in claim 2, wherein the computer-executable instructions further cause the computing system to perform at least the following:
   send the user a subset of the one or more corresponding storage silos, wherein the subset is chosen from the set of one or more corresponding storage silos; and
   send the user at least a portion of the compiled current and historical information, wherein the at least a portion of the compiled current and historical information comprises current and historical information for at least one corresponding storage silo within the subset of one or more corresponding storage silo,
   wherein identifying the one or more potential changes is based, at least in part, on the compiled current and historical information of the set of one or more corresponding storage silos.

4. A computing system as in claim 1, wherein the identification of one or more potential changes to the one or more words in the content of the electronic file comprises the computing system changing the one or more words to one or more different words within the electronic document.

5. A computing system as in claim 4, wherein changing the one or more words comprises the computing system modifying, adding, or deleting at least one word of the one or more words.

6. A computing system as in claim 1, wherein the computer-executable instructions further cause the computing system to perform at least the following:
receive one or more user instructions to implement at least one of the one or more potential changes; and
implement the at least one of the one or more potential changes in accordance with the one or more user instructions to generate a changed file.

7. The computing system as in claim 1, wherein the computer-executable instructions further cause the computing system to receive an updated electronic file from the user, wherein the updated electronic file comprises the electronic file incorporating at least one of the one or more potential changes to the content of the electronic file.

8. The computing system as in claim 1, wherein the computer-executable instructions further cause the computing system to automatically implement the one or more potential changes to the file, wherein automatically implementing the one or more potential changes to the content of the electronic file is based on one or more metrics associated with the set of one or more corresponding storage silos or the different set of one or more corresponding storage silos.

9. A method, implemented at a computer system that includes one or more processors, for managing routing of an electronic file within a destination database system, the method comprising:
receiving, at the computer system, an electronic file at a server analytic database system, the electronic file comprising (a) metadata and (b) content that is distinguished from the metadata and that includes a plurality of words;
the computer system parsing the content of the electronic file at the server analytic database system and detecting the plurality of words contained in the content of the electronic file;
the computer system identifying a plurality of potential storage silos associated with routing of electronic files, the plurality of potential storage silos including different sets of storage silos that are each associated with routing parameters for routing the electronic files to the different sets of storage silos based on different sets of words contained in the electronic files;
the computer system, based on the plurality of words contained in the content of the electronic file and based on the routing parameters for routing the electronic files to the different sets of storage silos based on the different sets of words, determining a first set of one or more storage silos from the plurality of potential storage silos is associated with potential routing for the electronic file rather than a different set of one or more corresponding storage silos from the plurality of potential storage silos;
the computer system identifying one or more potential changes to the one or more words in the content of the electronic file, wherein the one or more potential changes are determined to be sufficient to trigger a determination that a different set of one or more storage silos from the plurality of potential storage silos is associated with potential routing for the electronic file rather than the first set of one or more storage silos, the determination being based at least in part on a key mapping schema that includes historical trend data associated with other electronic files that have been routed to and/or stored within the plurality of potential storage silos based on at least one of a presence, frequency or location of certain words within the other electronic files that have been stored in and/or routed to the plurality of potential storage silos;
the computer system displaying, to a user, the one or more potential changes to the user prior to the one or more potential changes actually being made to the electronic file, and prior to routing of the electronic file to a destination storage silo of the first set of one or more corresponding storage silos; and
modifying the electronic file with the one or more potential changes subsequent to displaying the one or more potential changes; and
subsequent to the electronic file being modified with the one or more potential changes, determining the different set of the one or more storage silos is associated with potential routing of the electronic file rather than the first set of the one or more storage silos.

10. A method as in claim 9, wherein modifying the electronic file includes generating a modified version of the electronic file with the one or more potential changes by at least modifying the content of the electronic file for facilitating routing of the modified version of the electronic file to a storage silo in the different set of one or more corresponding storage silos rather than in the first set of one or more corresponding storage silos.

11. A method as in claim 9, wherein said determining the first set of one or more corresponding storage silos of the electronic file is at least partially based on a target metric associated with the different set of one or more corresponding storage silos, and wherein identifying the one or more potential changes to the one or more words in the content of the electronic file is based on a set of potential words associated with the different set of one or more corresponding storage silos, each storage silo of the different set of one or more corresponding storage silos comprising the target metric and being associated with at least one word from the set of potential words.

12. The computing system as recited in claim 5, wherein changing the one or more words comprises the computer system modifying the at least one word to a different word within the content of the electronic file by replacing the at least one word with the different word.

13. The computing system as recited in claim 5, wherein changing the one or more words comprises the computer system adding the at least one word to the content of the electronic file, or alternatively, deleting the at least one word from the content of the electronic file.

14. A computing system for facilitating detection and modifying of routing for an electronic file within one or more database systems, the computing system comprising:
one or more processors; and
one or more computer-readable hardware storage devices having stored thereon computer-executable instructions that are executable by the one or more processors to cause at least the following:
the computing system to receive an electronic file at a database system, the electronic file comprising (a) metadata and (b) content that is distinguished from the metadata and that includes one or more words;
the computing system to parse the content of the electronic file and detect the one or more words contained in the content of the electronic file that are associated with a set of potential storage silos of the electronic file from among a plurality of potential storage silos, the plurality of potential storage silos being associated with routing of electronic files based on routing parameters for routing the electronic files to the different sets of storage silos based on different sets of words contained in the electronic files;

the computing system, based on the one or more words contained in the content of the electronic file and based on the routing parameters for routing the electronic files to the different sets of storage silos based on the different sets of words, to determine a first set of one or more corresponding storage silos of the electronic file is associated with potential routing for the electronic file rather than a different set of one or more corresponding storage silos from the plurality of potential storage silos based at least in part on a key mapping schema that includes historical trend data associated with other electronic files that have been routed to and/or stored within the plurality of potential storage silos based on at least one of a presence, frequency or location of certain words within the other electronic files that have been stored in and/or routed to the plurality of potential storage silos;

the computing system to receive user input that identifies a target storage silo for intended routing of the electronic file;

the computing system to, based on and subsequent to identification of the target storage silo associated with the user input and routing parameters associated with the target storage silo, identify one or more potential changes to the one or more words in the content of the electronic file that are determined to be sufficient when the one or more potential changes are made to the content of the electronic file to cause a determination that the electronic file, after modification, is associated with routing parameters for routing the electronic file to a different set of one or more storage silos that include the target storage silo, and rather than the first set of one or more storage silos, from the potential storage silos; and the computing system to display the one or more words associated with the one or more potential changes that can be made to the content of the electronic file to the user prior to the one or more potential changes being made to the electronic file.

15. A computing system as in claim 14, wherein the computer-executable instructions further cause the computing system to generate the modified electronic file by incorporating the one or more potential changes to the one or more words in the content of the electronic file.

16. The computing system of claim 8, wherein the one or more metrics comprise a capacity.

17. The computing system of claim 8, wherein the one or more metrics comprises a length of time one or more files have been at a particular destination.

18. The computing system of claim 8, wherein the one or more metrics comprises a processing rate.

* * * * *